United States Patent
Wang et al.

(10) Patent No.: US 9,036,563 B2
(45) Date of Patent: May 19, 2015

(54) METHOD FOR ACHIEVING FREQUENCY REUSE IN WIRELESS COMMUNICATIONS SYSTEMS

(75) Inventors: Chao-Chun Wang, Taipei (TW); Yung-Ping Hsu, Sindian (TW); Yuh-Ren Jauh, Tao Yuan (TW)

(73) Assignee: MEDIATEK INC. (TW)

( * ) Notice: Subject to any disclaimer, the term of this patent is extended or adjusted under 35 U.S.C. 154(b) by 1198 days.

(21) Appl. No.: 12/317,569

(22) Filed: Dec. 27, 2008

(65) Prior Publication Data
US 2009/0116444 A1 May 7, 2009

Related U.S. Application Data

(60) Provisional application No. 61/082,539, filed on Jul. 22, 2008.

(51) Int. Cl.
*H04W 4/00* (2009.01)
*H04B 7/212* (2006.01)
(Continued)

(52) U.S. Cl.
CPC ........... *H04W 72/085* (2013.01); *H04B 7/0408* (2013.01); *H04W 72/0406* (2013.01); *H04W 72/082* (2013.01)

(58) Field of Classification Search
CPC ............. H04B 7/0408; H04W 72/082; H04W 72/085; H04W 72/0406
USPC .................................. 370/329, 338, 347, 431
See application file for complete search history.

(56) References Cited

U.S. PATENT DOCUMENTS

| 5,886,988 A | 3/1999 | Yun et al. ...................... 370/329 |
| 2004/0032847 A1 | 2/2004 | Cain ............................. 370/338 |

(Continued)

FOREIGN PATENT DOCUMENTS

| TW | 200501780 | 1/2005 |
| TW | 200520439 | 6/2005 |

OTHER PUBLICATIONS

Taiwan IPO Office Action for Taiwan patent application 098124379, dated Aug. 29, 2012(7 pages).
(Continued)

*Primary Examiner* — Derrick W. Ferris
*Assistant Examiner* — Farhad Ali
(74) *Attorney, Agent, or Firm* — Imperium Patent Works; Zheng Jin

(57) ABSTRACT

A method is provided for sharing a communications channel in a wireless communications system. A network coordinating device of the wireless network obtains a first path quality information of each of a first set of one or more communications paths between a first pair of communications devices. The coordinating device also obtains a second path quality information of each of a second set of communications paths between a second pair of communications devices. The coordinating device then determines one or more co-existing communications paths based on the first and the second path quality information in accordance with a predetermined rule. Finally, the coordinating device sends channel resource allocation information to the first pair and the second pair of communications devices to use corresponding co-existing communications paths such that the first pair and the second pair of communications devices communicate over the communications channel during a period of time concurrently.

21 Claims, 8 Drawing Sheets

(51) Int. Cl.
  *H04L 12/28* (2006.01)
  *H04W 72/08* (2009.01)
  *H04B 7/04* (2006.01)
  *H04W 72/04* (2009.01)

(56) References Cited

U.S. PATENT DOCUMENTS

| | | | |
|---|---|---|---|
| 2004/0185782 | A1 | 9/2004 | Halford et al. ............... 455/63.4 |
| 2005/0053004 | A1 | 3/2005 | Cain et al. ..................... 370/235 |
| 2005/0272432 | A1 | 12/2005 | Ji et al. .......................... 455/449 |
| 2006/0182077 | A1* | 8/2006 | Scherzer et al. .............. 370/338 |
| 2008/0095072 | A1 | 4/2008 | Shao et al. ..................... 370/254 |
| 2009/0073954 | A1* | 3/2009 | Maltsev et al. ............... 370/347 |

OTHER PUBLICATIONS

Taiwan Intellectual Property Office, Office Action of Taiwan patent application 098124379 dated Nov. 12, 2012(6 pages).

* cited by examiner

WIRELESS COMMUNICATIONS SYSTEM

METHOD FOR ACHIEVING FREQUENCY REUSE IN WIRELESS COMMUNICATIONS SYSTEMS

| COMMUNICA-TIONS DEVICE PAIR | COMMUNICA-TIONS PATH | TRANSMIT BEAM PATTERN | RECEIVE BEAM PATTERN | SIGNAL STRENGTH |
|---|---|---|---|---|
| FROM A TO B | #1 | $\alpha 1$ | $\beta 1$ | S1 |
|  | #2 | $\alpha 2$ | $\beta 2$ | S2 |
|  | #3 | $\alpha 3$ | $\beta 3$ | S3 |
| FROM B TO A | #4 | $\alpha 4$ | $\beta 4$ | S4 |
|  | #5 | $\alpha 5$ | $\beta 5$ | S5 |

ESTABLISHED COMMUNICATION PATHS BETWEEN PAIR OF COMMUNICATION DEVICE A AND B

| COMMUNICATIONS PATH | | CO-EXISTING COMMUNICATIONS PATH | |
|---|---|---|---|
| DEVICE PAIR | PATH | DEVICE PAIR | PATH |
| A TO B | 1 | X TO Y | J, K |
| A TO B | 2 | X TO Y | J |
| A TO B | 3 | X TO Y | K |
| B TO A | 4 | Y TO X | L |
| B TO A | 5 | Y TO X | M |
| X TO Y | J | A TO B | 1, 2 |
| X TO Y | K | A TO B | 1, 3 |
| Y TO X | L | B TO A | 4 |
| Y TO X | M | B TO A | 5 |
| X TO Z | P | Y TO B | 7 |
| Z TO X | Q | B TO Y | 8 |
| Y TO B | 7 | X TO Z | P |
| B TO Y | 8 | Z TO X | Q |

CONCURRENT ACCESS TABLE

FIG. 9

SCHEDULED CONCURRENT TRANSMISSION FOR DEVICE A AND X
USING SAME FREQUENCY BAND

METHOD FOR ACHIEVING FREQUENCY REUSE IN WIRELESS COMMUNICATIONS SYSTEMS

CROSS REFERENCE TO RELATED APPLICATIONS

This application claims priority under 35 U.S.C. §119 from U.S. Provisional Application No. 61/082,539, entitled "A Method for Achieving Frequency Reuse Among a Set of Communications Devices in Proximity to Each Other," filed on Jul. 21, 2008, the subject matter of which is incorporated herein by reference.

TECHNICAL FIELD

The present invention relates generally to wireless communications systems, and, more particularly, to frequency reuse in high frequency high data rate wireless communications systems.

BACKGROUND

Wireless Personal Area Networks (WPANs) are wireless networks used for communication and interoperation of portable and mobile computing devices such as PCs, Personal Digital Assistants (PDAs), peripherals, cell phones, pagers, and other consumer electronics. IEEE 802.15 is a working group of the IEEE 802 LAN/MAN Standards Committee, which specializes in WPAN Standards.

For high frequency and high data rate wireless networks, IEEE 802.15.3 Task Group 3c (TG3c) is developing a millimeter-wave-based alternative Medium Access Control (MAC) and physical layer for the existing 802.15.3 WPAN Standard. This mmWave WPAN will operate in the unlicensed band covering 57-64 GHz defined by FCC 47 CFR 15.255. The mmWave WPAN standard specifies a high data rate MAC and PHY with at least one Giga bits per second (Gbps) for applications such as high speed internet access, streaming content download (for instance, video on demand, home theater, etc.) The mmWave WPAN will also support very high data rates in excess of two Gbps for time dependent applications such as real time multiple High Definition television (HDTV) video stream and wireless data bus for cable replacement.

Because of the scarce radio spectrum resource and the very high data rate requirement, it is desirable to be able to share or reuse the same frequency channel among different communications devices. For high frequency and high data rate wireless communications systems such as the mmWave WPAN, sharing the same radio spectrum resource would dramatically improve the overall system capacity. Such frequency reuse scheme, however, increases co-channel interference caused by neighboring communications devices using the same frequency channel. As a result, the overall system performance suffers.

Smart antenna is one of the promising technologies that would enable a higher capacity in wireless networks by effectively reducing co-channel interference. Various proposals have been made in wireless networks such as the IEEE 802.15.3c and other mmWave systems to explore the possibility of frequency reuse. Better solutions are sought to continue to improve system capacity without degrading system performance utilizing smart antenna technology.

SUMMARY

A method is provided for sharing a communications channel in a wireless communications system. A network coordinating device of the wireless network obtains a first path quality information of each of a first set of one or more communications paths between a first pair of communications devices. The network coordinating device also obtains a second path quality information of each of a second set of one or more communications paths between a second pair of communications devices. The network coordinating device then determines one or more co-existing communications paths based on the first and the second path quality information in accordance with a predetermined rule. In addition, the network coordinating device creates a concurrent access table that includes all possible entries of co-existing communications paths in the wireless communications system. Finally, the coordinating device sends channel resource allocation information to the first pair and the second pair of communications devices to use corresponding co-existing communications paths such that the first pair and the second pair of communications devices communicate over the communications channel during a period of time concurrently.

In one embodiment, the wireless communications system is a high frequency and high data rate ad hoc wireless network. All communications devices in the wireless network are located in proximity with one another and communicate using directional antennas. Smart antenna technology is employed to establish all possible communications paths between each pair of communications devices. Through smart antenna technology, when multiple communications devices transmit data concurrently and share the same frequency channel, co-channel interference caused by frequency reuse may be effectively reduced. In one novel aspect, the concurrent access table not only provides information on which pairs of communications devices coexist with each other, but also provides information on which pairs of communications paths coexist with each other based on the predetermined rule, such as an SIR threshold value. By changing the predetermined rule properly, a desired tradeoff can be achieved between improving system capacity through frequency reuse and maintaining acceptable system performance.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a concurrent access table that includes multiple entries of co-existing communications paths.

DETAILED DESCRIPTION

Reference will now be made in detail to some embodiments of the invention, examples of which are illustrated in the accompanying drawings.

Figure 1:
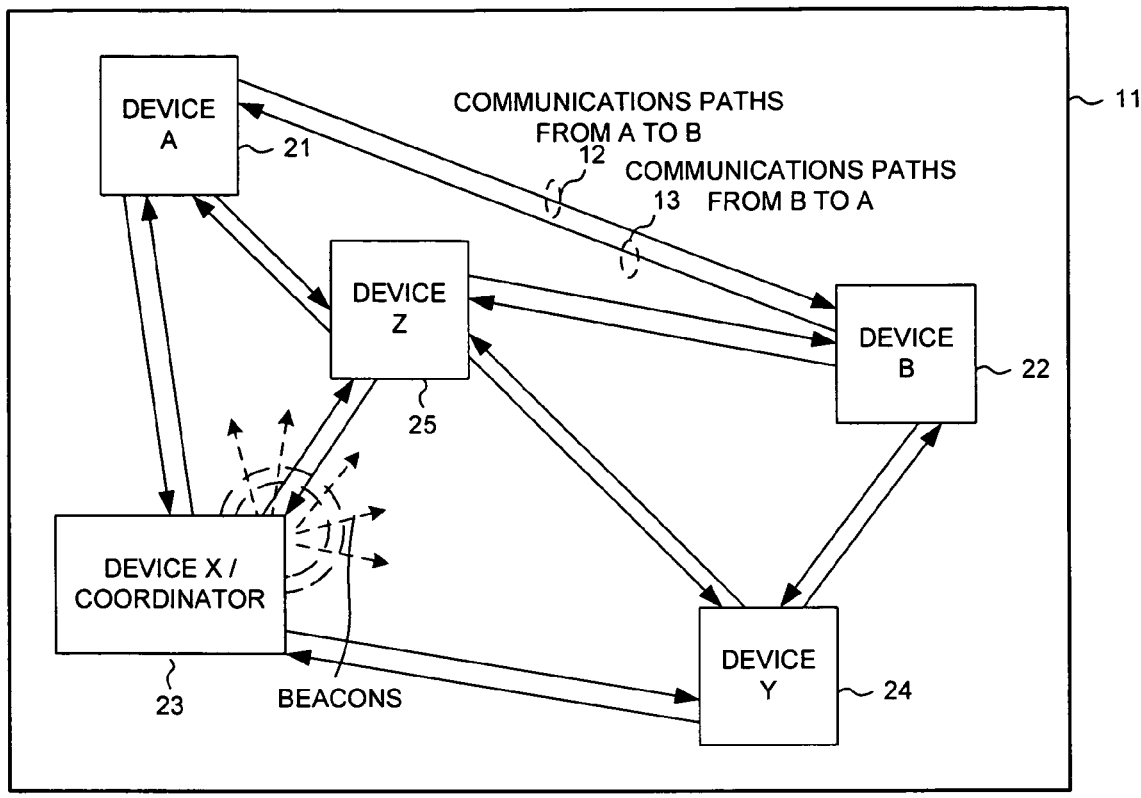
FIG. 1 is a simplified diagram of a wireless communications system in accordance with one novel aspect.

FIG. 1 is a simplified diagram of a wireless communications system (also referred to as a wireless network) 11 in accordance with one novel aspect. Wireless communications system 11 includes communications devices A (21), B(22), X(23), Y(24), and Z(25), each of the devices is located in proximity with one another (for instance, a distance within three to ten meters). In the example of FIG. 1, communications devices A, B, X, Y, and Z in the wireless communications system 11 communicate with one another in a peer-to-peer manner using directional antennas. To exchange data, two communications devices establish one or more communications paths between them. In the example of FIG. 1, communications device A(21) and B(22) form a pair of communications devices. One set of communications paths 12 are established to transmit data from communications device A to B, and another set of communications paths 13 are established to transmit data from communications device B to A. By establishing two sets of communications paths 12 and 13 in both directions, the pair of communications devices A(21) and B(22) are able to transmit and receive data with each other in both directions.

As illustrated in FIG. 1, wireless communications system 11 is a coordinated network, managed by a network coordinating device X(23). Network coordinating device X provides timing information for wireless communications system 11 by periodically transmitting beacon frames. The beacon frames are broadcasted by network coordinating device X(23) for network synchronization and management. Additionally, network coordinating device X(23) manages the quality of service (QoS) requirements, power save modes and access control in wireless communications system 11. For example, as a fully coordinated network, each communications device cannot transmit data until a period of channel access time has been allocated by network coordinating device X(23). Therefore, whenever a communications device needs to transmit data, it sends a request to network coordinating device X(23) for channel access time. In response, network coordinating device X(23) allocates a period of access time based on network conditions.

Figure 2:
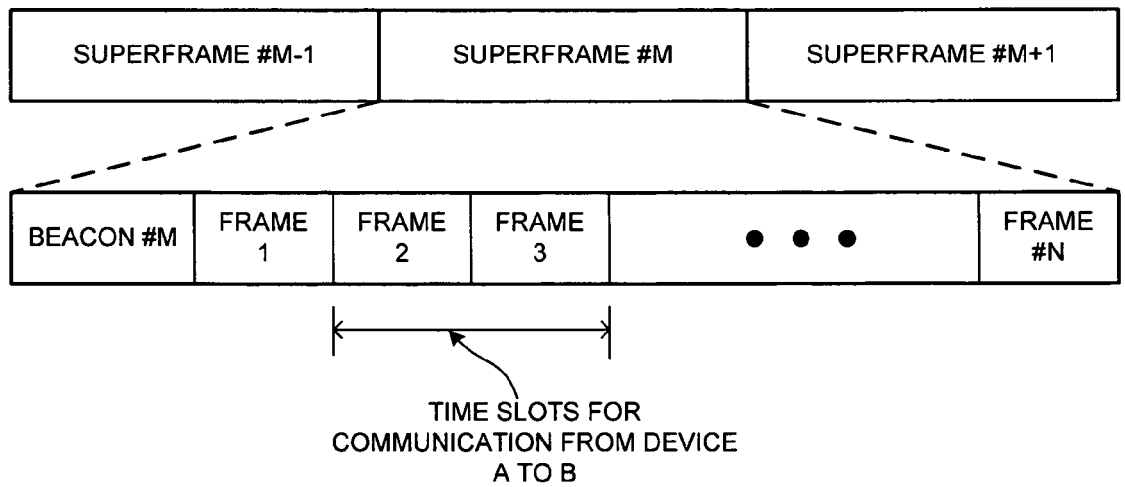
FIG. 2 is a superframe structure used in a wireless communications system.

FIG. 2 is an exemplary superframe structure used in wireless communications system 11. Each superframe (for instance, superframe #M) starts with a beacon frame followed by a plurality of frames starting from frame #1 to frame #N. Each frame has a specific frame type such as a beacon frame, a data frame, a command frame, or an acknowledgement (ACK) frame. The beacon frame provides the basic timing and synchronization information of wireless network 11, broadcasted regularly in every superframe. The length of each superframe thus represents a beacon interval, that is, the amount of time (for instance, a few milliseconds) between each beacon transmission. In addition to network synchronization, the beacon frame may be used for network management such as channel time allocation. Each beacon frame contains information elements describing channel access time for a communications device to transmit data. In the example of FIG. 2, the time slots of frames #2 and #3 are allocated for communications device A(21) to send data to communications device B(22). See IEEE 802.15.3-2003 specification for reference for more detailed description on superframe structure.

Figure 3:
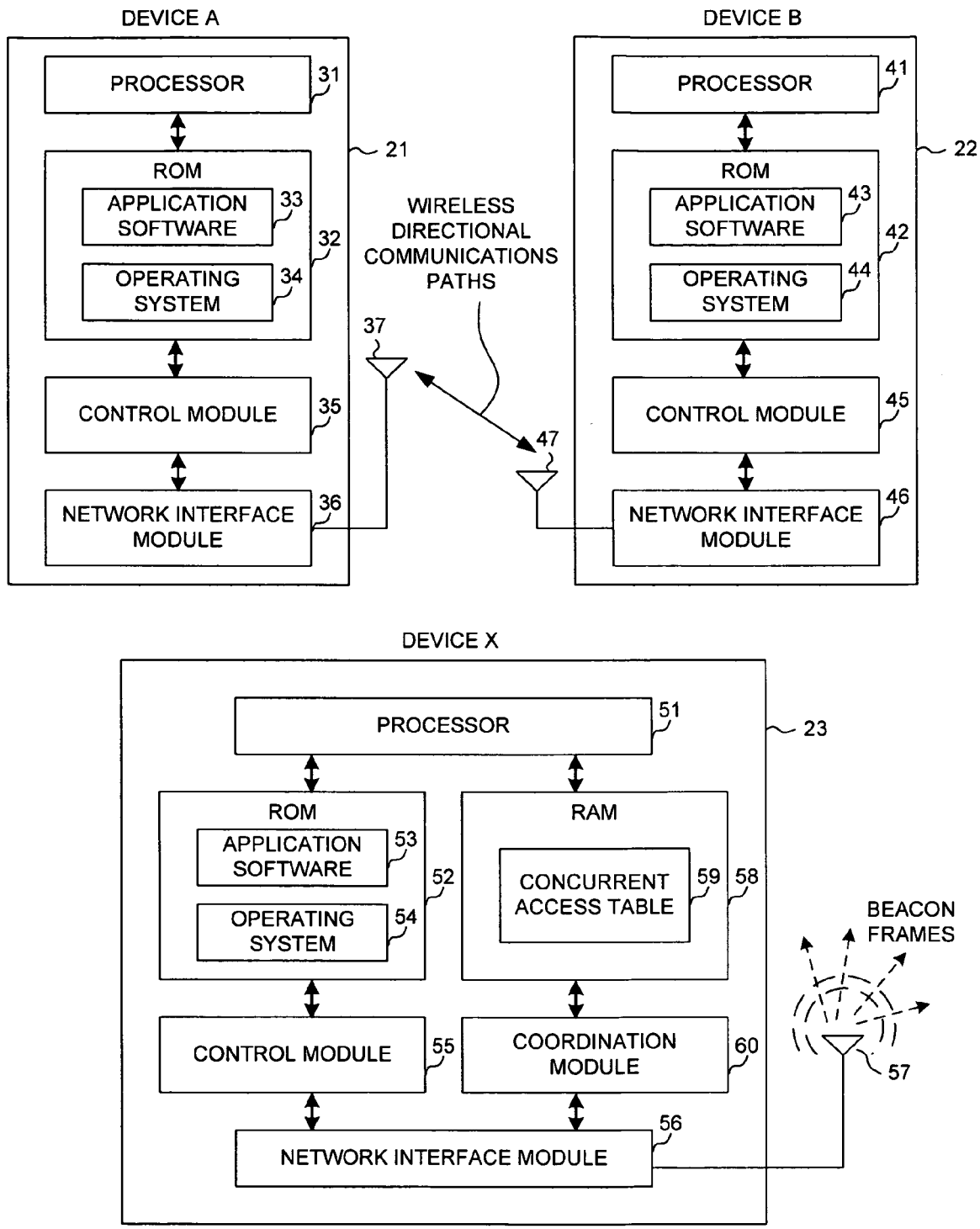
FIG. 3 is a simplified block diagram of communications devices and network coordinating devices in a wireless communications system.

FIG. 3 is a simplified block diagram of communications devices A and B and network coordinating device X in wireless communications system 11. Communications device A(21) comprises a processor 31, memory module 32 that stores application software 33 and operating system 34, a control module 35, a network interface module 36, and a directional antenna 37. Similarly, communications device B(22) comprises a processor 41, memory module 42 that stores application software 43 and operating system 44, a control module 45, a network interface module 46, and a directional antenna 47. For communications devices A and B, network interface modules 36 and 46 are used to transmit and receive data through directional antennas 37 and 47. Control modules 35 and 45 are used to process the data and to perform certain functions accordingly.

As illustrated in FIG. 3, network coordinating device X(23) operates as either a normal communications device or a network coordinating device. As a normal communications device, network coordinating device X(23) comprises a processor 51, memory module 52 that stores application software 53 and operating system 54, a control module 55, a network interface module 56, and an antenna 57. Unlike a normal directional antenna, however, antenna 57 may have different operational modes. In order to broadcast beacon frames, antenna 57 may operate in either quasi-omni mode or directional mode. In quasi-omni mode, the same beacon frame is transmitted to different directions simultaneously. In directional mode, on the other hand, the same beacon frame is transmitted to different directions in a round-robin way in order to coordinate all communications devices located in different directional coverage.

Additionally, network coordinating device X(23) further includes a random-access memory module (RAM) 58 that stores a concurrent access table 59, and a coordination module 60 that performs certain functions for network synchronization and management purposes. For example, for the purpose of allocating channel access time, network coordinating device X(23) creates concurrent access table 59 to facilitate frequency reuse. When multiple pairs of communications devices request to transmit data simultaneously, network coordinating device X(23) may allocate the same period of channel access time to the multiple pairs of communications devices based on information provided by concurrent access table 59. More detail on concurrent access table 59 is illustrated below with respect to FIG. 9.

Figure 4:
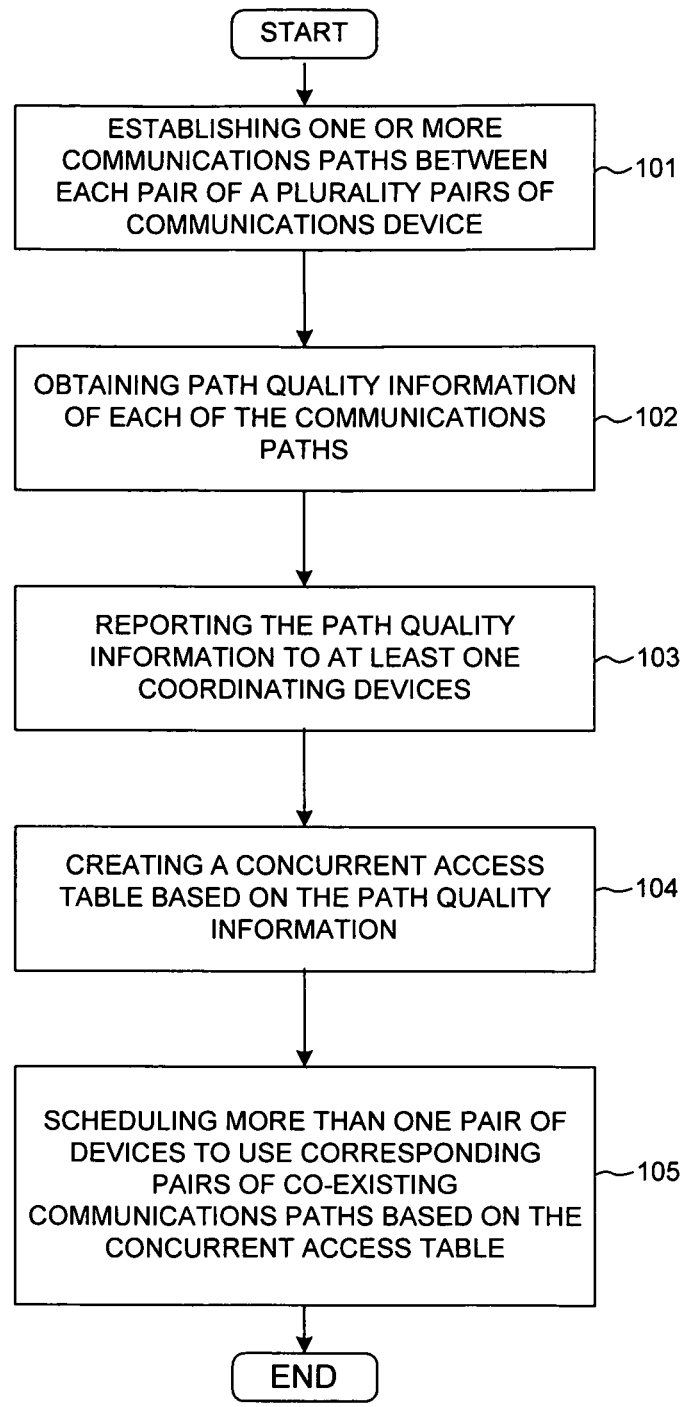
FIG. 4 is a flow chart of a method for achieving frequency reuse in a wireless communications system in accordance with one novel aspect.

FIG. 4 is a flow chart of a method for achieving frequency reuse in a wireless communications system in accordance with one novel aspect. First, when a new communications device joins a wireless network, a network coordinating device instructs the new device to establish all possible communications paths with all other existing communications devices in the wireless network (step 101, also referred as a training process). After the training process, each communications device then starts to measure path quality and thereby obtain path quality information for each of the established communications paths (step 102, also referred as interference assessment). After interference assessment, each communications device reports the measured path quality information to the network coordinating device (step 103). Next, the network coordinating device receives the path quality information from each communications device and creates a concurrent access table (step 104). Finally, the network coordinating device schedules two or more pairs of communications devices to communicate concurrently and share the same frequency channel during the same period of time based on the concurrent access table (step 105).

FIGS. 5-10 illustrate exemplary embodiments in more details in achieving frequency reuse in wireless network 11 in accordance with the method illustrated in FIG. 4. In the examples of FIGS. 5-10, communications paths are established between a pair of communications devices using smart antenna technology. A smart antenna employs the process of digital beamforming and is able to focus the radiation beam pattern of a radio signal in a particular direction. By controlling the radiation beam pattern of the transmission of the radio signal, only the intended receiver receives the radio signal transmitted by a transmitter. Therefore, through smart antenna technology, when multiple communications devices transmit data concurrently and share the same frequency channel, co-channel interference caused by frequency reuse may be effectively reduced.

Figures 5, 6:
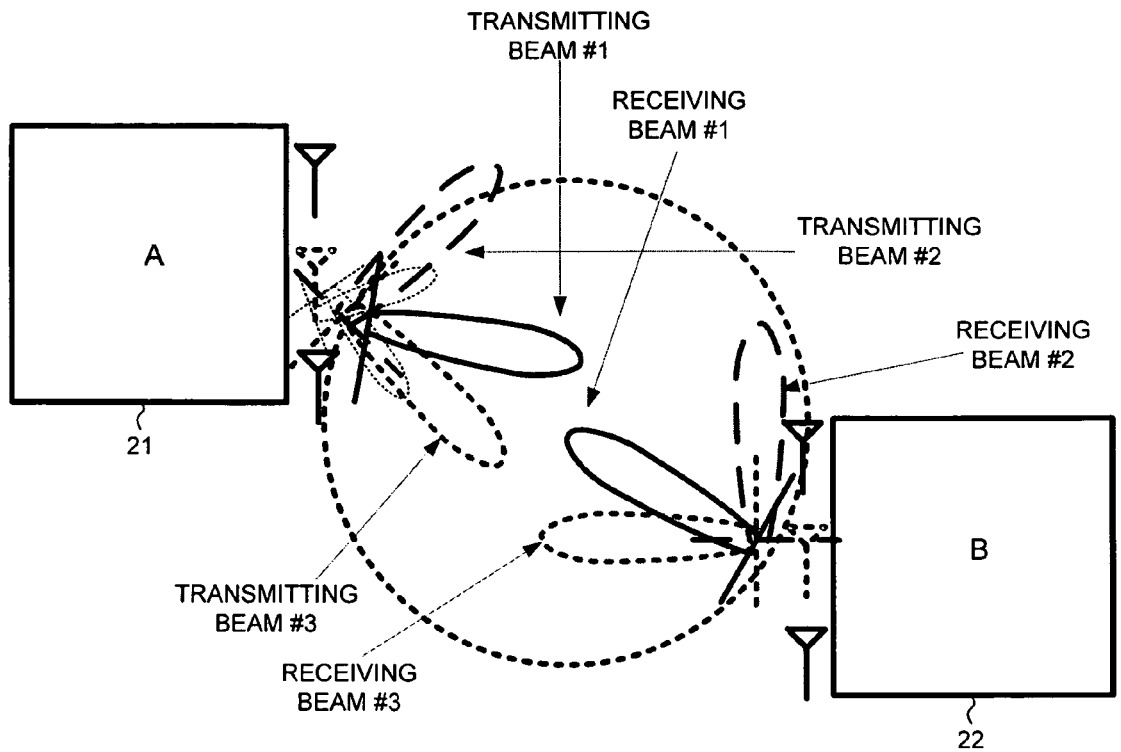
FIG. 5 is a diagram that illustrates a process of establishing multiple communications paths between a pair of communications devices.
FIG. 6 is a table that includes multiple communications paths established between a pair of communications devices.

FIG. 5 illustrates a training process of establishing multiple communications paths between a pair of communications devices A(21) and B(22). To initiate the training process between devices A and B, network coordinating device X(23) instructs all other devices in the network to remain silent. In the example of FIG. 5, a set of communications paths from device A to device B is established for data to be transmitted from device A and to be received by device B. When the training process starts, communications device A starts to transmit a radio signal with a specific transmit beam pattern, and communications device B starts to receive the radio signal with a specific receive beam pattern. For each specific transmit beam pattern, communications device B adjusts the receive beam pattern to receive the radio signal. If the signal strength received by device B is greater than a predetermined threshold value, then an acceptable communications path is established. Communications device A also adjusts the transmit beam pattern to transmit the radio signal. This training process is repeated for all possible permutations and combinations of transmit beam patterns of device A(21) and receive beam patterns of i device B(22).

FIG. 6 is a table 70 that illustrates multiple communications paths established between a pair of communications devices A and B. Because of the nature of directional communications using directional antenna, the communications paths established from device A to device B are different from the communications paths established from device B to device A. In the example of table 70, three communications paths #1, #2 and #3 are established from device A to device B, and two communications paths #5 and #6 are established from device B to device A. Each communications path is established such that the signal strength S1-S5 exceeds a predetermined threshold value. Each communications path includes a transmit beam pattern of the transmitter and a receive beam pattern of the receiver. For example, communications path #1 includes a transmitting angle al to be used by antenna 37 (see FIG. 3) of device A and a receiving angle β1 to be used by antenna 47 (see FIG. 3) of device B. Once the communications paths are established, the corresponding beam patterns are saved in the memory of device A and device B.

Figure 7:
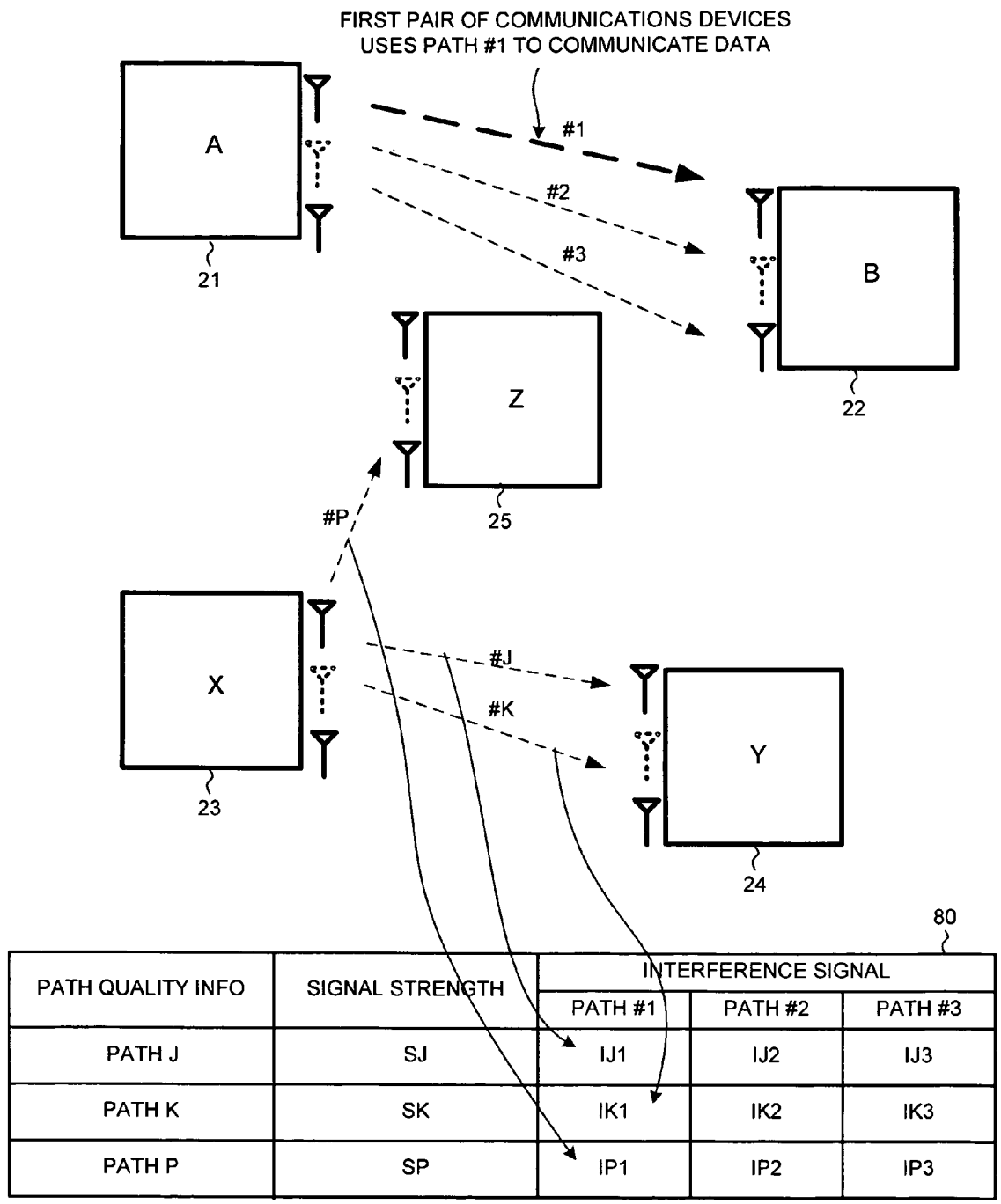
FIG. 7 is a diagram that illustrates interference assessment and path quality information among different pairs of communications devices.

FIG. 7 is a diagram that illustrates interference assessment and path quality information among different pairs of communications devices. To initiate interference assessment, network coordinating device X(23) instructs only one pair of communications devices to communicate using a specific communications path during a certain time period, while instructs all other devices to detect and measure the received interference signal during the same time period. In the example of FIG. 7, there are three pairs of communications devices: a first pair of devices A(21) and B(22) having three established communications paths #1, #2 and #3, a second pair of devices X(23) and Y(24) having two established communications paths #J and #K, and a third pair of devices X(23) and Z(25) having one established communications path #P.

As illustrated in table 80 of FIG. 7, during interference assessment, the first pair of devices A(21) and B(22) starts to communicate using communications path #1 while the second and the third pairs of communications devices detect and measure the received interference signal. Based on the received interference signal strength, the second and the third pairs of devices calculate the path quality information. This process is repeated for every communications path between every pair of communications devices in the network. As a result, each pair of devices is able to obtain the path quality information for each of its communications path when another pair of devices is transmitting data using another communications path.

In one novel aspect, interference assessment may be achieved when one pair of communications devices are exchanging real data. Normally, the network coordinating device allocates a dedicated time slot for one pair of devices to exchange dummy data while instructs other devices to make interference assessment. Therefore, it takes quite some time to complete the interference assessment process for the entire network. Moreover, none of the communications devices is able to exchange real data during that time. In accordance with the novel aspect, however, interference assessment may be achieved under normal operation. Whenever one pair of communications devices request to communicate, the network coordinating device allocates a time slot for the pair of devices, and also instructs other devices to make interference assessment during that time slot. By initiating interference assessment dynamically without using dedicated time slot, the overall interference assessment process is more efficient.

Figure 8:
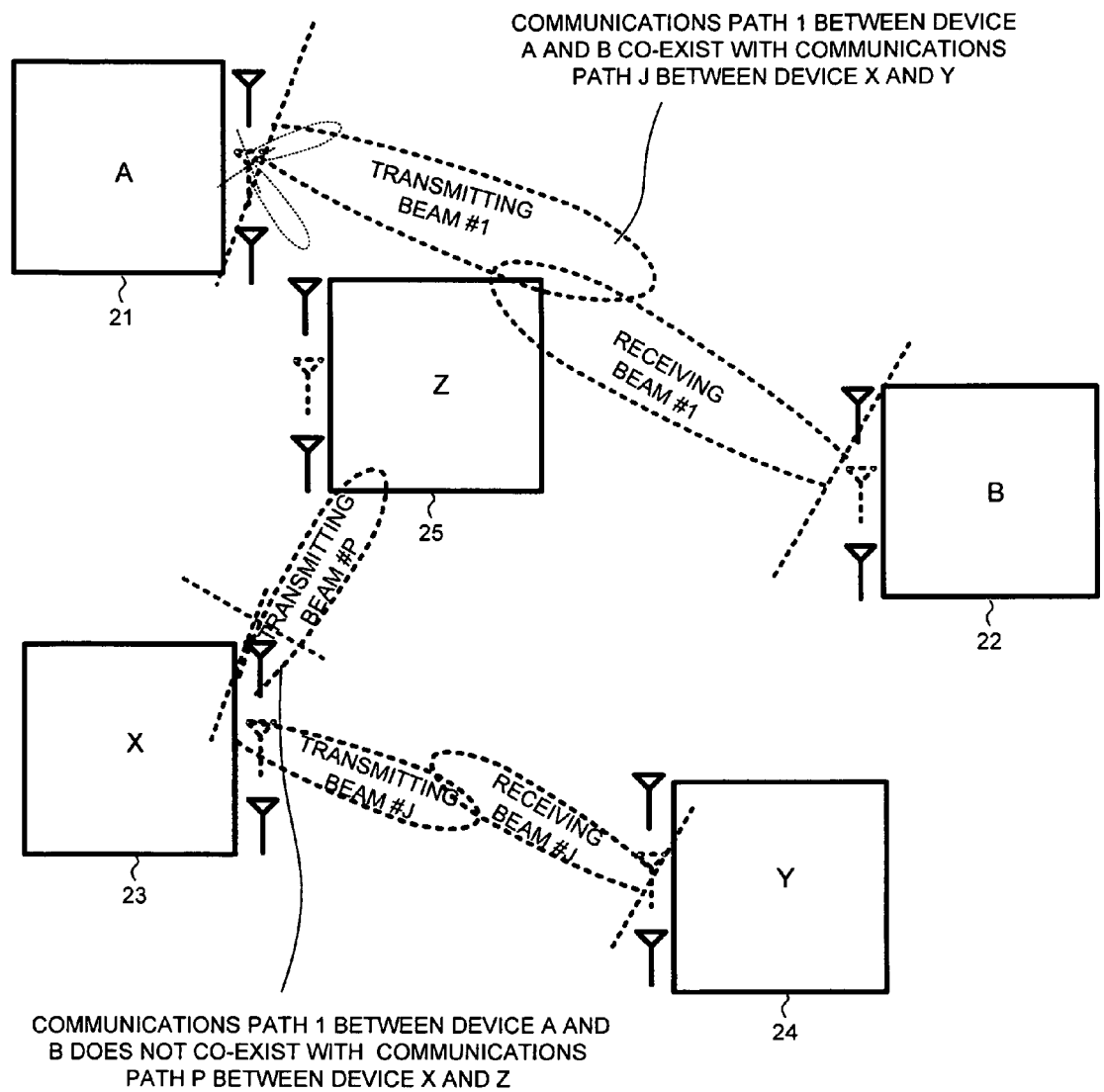
FIG. 8 is a diagram that illustrates co-existing communications paths among different pairs of communications devices.

FIG. 8 illustrates co-existing communications paths among different pairs of communications devices based on the path quality information obtained through the interference assessment process. Network coordinating device X(23) receives all the path quality information obtained by each communications device and determines whether two communications paths co-exist. Two communications paths are determined to be co-existing when the path quality information of both of the communications paths exceeds a predetermined threshold when the two pair of devices communicate with each other concurrently. In the example of FIG. 8, communications devices A and B receive relatively weak interference signal using communications path #1 when communications devices X and Y communicate using communications path J, and communications devices X and Y also receive relatively weak interference signal using communications path #J when communications devices A and B communicate using communications path #1. As a result, a pair of co-existing communications paths of path #1 and path #J is established. Therefore, the co-existence of path #1 and path #J indicates that device A may transmit data to device B using path #1 and device X may transmit data to device Y using path #J concurrently sharing the same frequency channel without introducing strong co-channel interference. On the other hand, communications devices A and B detect relatively strong interference signal when communications device X transmits data to communications device Z using communications path #P. As a result, communications path #1 does not co-exist with communications path #P and no frequency reuse can be achieved for devices A and X using communications path #1 and #P.

FIG. 9 illustrates concurrent access table 59 that includes a plurality of entries of co-existing communications paths of wireless network 11. Concurrent access table 59 is created by network coordinating device X(23) and saved in memory module 58 after it determines all possible co-existing communications paths in wireless network 11. In the example of FIG. 9, each entry in concurrent access table 59 includes a pair of co-existing communications paths. For example, communications path #2 from device A(21) to B(22) co-exists with communications path #J from device X(23) to Y(24), and communications path #4 from device B(22) to A(21) co-exists with communications path #L from device Y(24) to X(23). One communications path may also co-exist with multiple communications paths. For example, communications path #1 from device A to B co-exists with both communications paths #J and #K from deice X to Y.

In one novel aspect, concurrent access table 59 not only provides information on which pairs of communications devices coexist with each other, but also provides more detailed information on which pairs of communications paths coexist with each other. First, more than one communications paths can be established between every pair of communications devices based on a predetermined threshold value of signal strength. Second, co-existing communications paths can also be established based on a predetermined threshold value of path quality information. Therefore, by adjusting the predetermined threshold values, a desired tradeoff can be achieved between improving system capacity through frequency reuse and maintaining acceptable quality of service (QoS) of the network.

Figure 10:
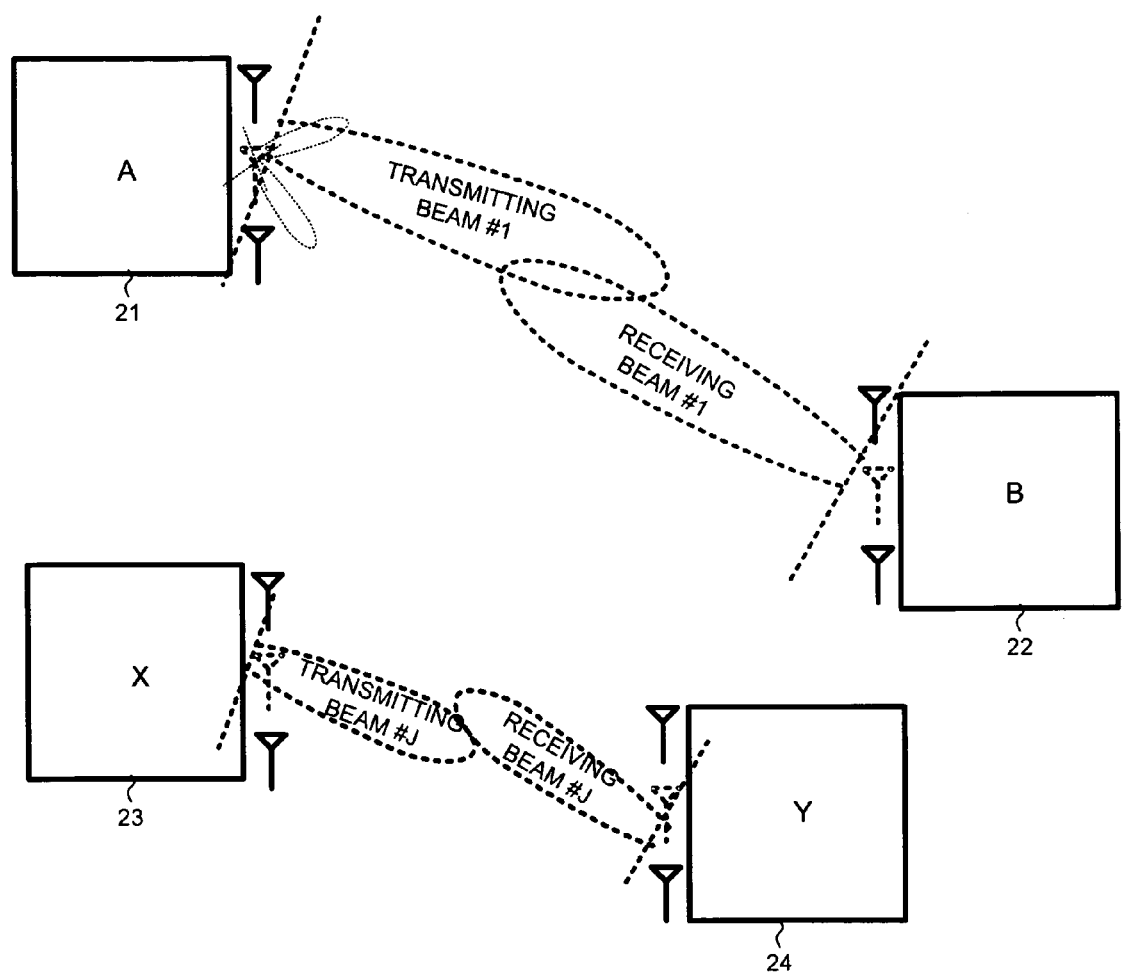
FIG. 10 is a diagram that illustrates frequency reuse using co-existing communications paths in a wireless communications system.

FIG. 10 is a diagram that illustrates frequency reuse by using co-existing communications paths in wireless communications system 11. Based on concurrent access table 59 of FIG. 9, network coordinating device X(23) is able to determine whether frequency reuse can be achieved. In the example of FIG. 10, communications device A(21) sends a request to network coordinating device X(23) for channel access time to transmit data to device B(22). At the same time, communications device X(23) also sends a request to network coordinating device X(23) (in this example, the two devices are the same device) for channel access time to transmit data to device Y(24). Before allocating the radio resource, network coordinating device X(23) finds an entry of a pair of co-existing communications paths of path #1 and #J in concurrent access table 59. Accordingly, network coordinating device X(23) schedules devices A(21) and B(22) to transmit and receive data using communications paths #1, and schedules devices X(23) and Y(24) to transmit and receive data using communications path #J concurrently. By sharing a same frequency channel by two pairs of devices, system capacity of wireless network 11 is increased.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    (a) obtaining a first path quality information for each of a first set of multiple communications paths for each unidirectional transmission between a first pair of communications devices;
    (b) obtaining a second path quality information for each of a second set of multiple communications paths for each unidirectional transmission between a second pair of communications devices;
    (c) determining multiple co-existing communications paths based on the first and the second path quality information in accordance with a first predetermined rule by a coordinating device; and
    (d) sending channel resource allocation information to the first pair and the second pair of communications devices to use corresponding co-existing communications paths such that the first pair and the second pair of communications devices communicate over the communications channel during a period of time concurrently, wherein each communication path is established by beamforming using directional antennas to form multiple directional beam patterns, wherein the beamforming involves adjusting a receiving beam pattern of a non-coordinating receiving communications device for each corresponding transmitting beam pattern of a non-coordinating transmitting communications device according to a second predetermined rule.

2. The method of claim 1, wherein each of the first set of communications paths between the first pair of communicaitons devices comprises a beam pattern of transmitting antenna of a first transmitting communications device and a beam pattern of receiving antenna of a first receiving communications device.

3. The method of claim 2, wherein the first pair of communications devices comprise a device A and a device B, and wherein beam patterns of a communication path from device A to device B are different from beam patterns of a communications path from device B to device A.

4. The method of claim 1, wherein the first path quality information comprises:
    signal strength of recevied signals of each of the first set of communications paths; and
    signal strength of interference signals when the second pair of communications devices communicate over each of the second set of communications paths.

5. The method of claim 4, wherein the interference signals are signals received by the first pair of communicaitons devices when the second pair of communications devices communicate with each other.

6. The method of claim 1, wherien the channel resource allocation information comprises access time, a first communicatin path for the first pair of communications devices, and a second communications path for the second pair of communications devices.

7. The method of claim 1, wherein the one or more co-existing communications paths are entered into a concurrent access table.

8. The method of claim 1, further comprising:
    (d) instructing the first pair of communications devices to measure a first path quality and thereby obtaining the first path quality information.

9. The method of claim 1, wherein the first predetermined rule is based on path quality information, wherein the second predetermined rule is based on signal strength, and wherein the first predetermined rule and the second predetermined rule are adusted to achieve a tradeoff between system capacity and performance.

10. A method comprising:
(a) establishing a set of multiple communications paths in the communications channel for each unidirectional transmission between a pair of a first and a second communications devices;
(b) measuring a path quality and thereby obtaining path quality information of each of the set of multiple communications paths;
(c) reporting the path quality information to a coordinating device; and
(d) receiving channel resource allocation information from the coordinating device, wherein channel resource allocation information comprises co-existing communications paths based at least in part on the path quality information in accordance with a predetermined rule, and wherein the pair of communications devices and a second pair of communications devices use corresponding co-existing communications paths to communicate over the communications channel during a period of time concurrently, wherein each communication path is established by beamforming using directional antennas to form multiple directional beam patterns, wherein the beamforming involves adjusting a receiving beam pattern of a non-coordinating receiving communications device for each corresponding transmitting beam pattern of a non-coordinating transmitting communications device according to a second predetermined rule.

11. The method of claim 10, wherein each of the set of communications paths comprises a beam pattern of transmitting antenna of the first communications device and a beam pattern of receiving antenna of the second communications device.

12. The method of claim 10, wherein the path quality information comprises:
signal strength of recevied signals of each of the set of communications paths; and
signal strength of interference signals when the second pair of communications devices communicate over each of a second set of communications paths.

13. The method of claim 12, wherein the interference signals are signals received by the pair of communications device when the second pair of communications devices communicate with each other.

14. The method of claim 10, wherien the channel resource allocation information comprises access time, a first communicatin path for the pair of communications devices, and a second communications path for the second pair of communications devices.

15. The method of claim 10, wherien the path quality is measured during a non-dedicated time period.

16. A coordinating device comprising:
a control module that obtains a first path quality information for each of a first set of multiple communications paths for each unidirectional transmission between a first pair of communications devices, wherein the control module also obtains a second path quality information for each of a second set of multiple communications paths for each unidirectional transmission between a second pair of communications devices;
a coordination module that determines multiple co-existing communications paths based on the first and the second path quality information in accordance with a predetermined rule; and
a network interface module that sends channel resource allocation information to the first pair and the second pair of communications devices to use corresponding co-existing communications paths such that the first pair and the second pair of communications devices communicate over the communications channel during a period of time concurrently, wherein each communication path is established by beamforming using directional antennas to form multiple directional beam patterns, wherein the beamforming involves adjusting a receiving beam pattern of a non-coordinating receiving communications device for each corresponding transmitting beam pattern of a non-coordinating transmitting communications device according to a second predetermined rule.

17. The device of claim 16, wherein each of the first set of communications paths between the first pair of communicaitons devices comprises a beam pattern of transmitting antenna of a first transmitting communications device and a beam pattern of receiving antenna of a first receiving communications device.

18. The device of claim 17, wherein the first pair of communications devices comprise a device A and a device B, and wherein beam patterns of a communication path from device A to device B are different from beam patterns of a communications path from device B to device A.

19. The device of claim 16, wherein the first path quality information comprises:
signal strength of recevied signals of each of the first set of communications paths; and
signal strength of interference signals when the second pair of communications devices communicate over each of the second set of communications paths.

20. The device of claim 19, wherein the interference signals are signals received by the first pair of communicaitons devices when the second pair of communications devices communicate with each other.

21. The device of claim 16, wherien the channel resource allocation information comprises access time, a first communicatin path for the first pair of communications devices, and a second communications path for the second pair of communications devices.

* * * * *

UNITED STATES PATENT AND TRADEMARK OFFICE
CERTIFICATE OF CORRECTION

| | | |
|---|---|---|
| PATENT NO. | : 9,036,563 B2 | Page 1 of 1 |
| APPLICATION NO. | : 12/317569 | |
| DATED | : May 19, 2015 | |
| INVENTOR(S) | : Wang et al. | |

It is certified that error appears in the above-identified patent and that said Letters Patent is hereby corrected as shown below:

In the Specification

Column 9, lines 2, the word "adusted" should be changed to --adjusted--.

In the Claims

Claim 9, the text of column 8, lines 65-67, and column 9, lines 1-3 should now read:

9. The method of claim 1, wherein the first predetermined rule is based on path quality information, wherein the second predetermined rule is based on signal strength, and wherein the first predetermined rule and the second predetermined rule are adjusted to achieve a tradeoff between system capacity and performance.

Signed and Sealed this
Fourth Day of August, 2015

Michelle K. Lee
*Director of the United States Patent and Trademark Office*